(12) United States Patent
Dupont

(10) Patent No.: US 8,689,932 B2
(45) Date of Patent: Apr. 8, 2014

(54) ON-BASE ENCLOSURE

(75) Inventor: Denis Dupont, Belfort (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/473,734

(22) Filed: May 17, 2012

(65) Prior Publication Data

US 2013/0307396 A1    Nov. 21, 2013

(51) Int. Cl.
| | |
|---|---|
| *E04H 1/00* | (2006.01) |
| *G10K 11/04* | (2006.01) |
| *H02K 5/24* | (2006.01) |
| *B64F 1/26* | (2006.01) |
| *F02B 77/13* | (2006.01) |

(52) U.S. Cl.
USPC ............ 181/200; 52/79.1; 181/202; 181/203; 181/204; 220/4.02

(58) Field of Classification Search
USPC ........ 52/79.1, 79.12, 144; 181/198, 200, 202, 181/203, 204; 220/4.02, 3.92, 3.9, 3.8; 174/559
See application file for complete search history.

(56) References Cited

U.S. PATENT DOCUMENTS

| | | | |
|---|---|---|---|
| 3,462,949 A * | 8/1969 | Anderson et al. ................ 60/796 |
| 3,791,682 A * | 2/1974 | Mitchell ............................ 290/2 |
| 3,885,362 A * | 5/1975 | Pollock ........................ 52/126.7 |
| 4,007,388 A * | 2/1977 | Lawyer et al. ................... 310/51 |
| 4,226,214 A | 10/1980 | Palazzetti |
| 5,649,418 A * | 7/1997 | Ludwig ............................ 60/801 |
| 6,962,057 B2 | 11/2005 | Kurokawa et al. |
| 7,543,793 B2 | 6/2009 | Graham et al. |
| 8,544,596 B2 * | 10/2013 | Dupont ......................... 181/203 |
| 2005/0115246 A1 * | 6/2005 | Bellingrath ..................... 60/772 |
| 2005/0257439 A1 * | 11/2005 | Sarver et al. ................... 52/79.1 |
| 2007/0079573 A1 * | 4/2007 | Sarine et al. ................. 52/592.1 |
| 2007/0151169 A1 * | 7/2007 | Kandasamy .................... 52/79.1 |
| 2009/0049842 A1 * | 2/2009 | Canham et al. ................. 60/796 |
| 2009/0229194 A1 * | 9/2009 | Armillas ........................ 52/79.1 |
| 2010/0163705 A1 | 7/2010 | Sassatelli et al. |
| 2010/0251629 A1 * | 10/2010 | Clidaras et al. ................ 52/79.1 |

FOREIGN PATENT DOCUMENTS

| | | |
|---|---|---|
| CN | 200965136 | 10/2007 |
| JP | 2006105052 | 4/2006 |
| JP | 2006105052 A | 4/2006 |
| WO | 8501987 A1 | 5/1985 |

* cited by examiner

Primary Examiner — Ryan Kwiecinski
(74) Attorney, Agent, or Firm — Ernest G. Cusick; Hoffman Warnick LLC

(57) ABSTRACT

An on-base enclosure for equipment is disclosed. The on-base enclosure has walls attached to a base for equipment such that the walls are attached to the base at a distance away from the base. By providing the walls away from the base, more room is provided around the equipment within the enclosure.

14 Claims, 6 Drawing Sheets

ON-BASE ENCLOSURE

FIELD OF THE INVENTION

The invention generally relates to an enclosure mounted on a base, where the base supports a piece of equipment.

BACKGROUND OF THE INVENTION

Large pieces of equipment or modules of equipment located at plants or other locations are often enclosed in structures for various reasons, including protecting the equipment from the outside environment, including heat, cold, dust, humidity, and precipitation; providing acoustical attenuation of noise generated by the equipment; and to protect individuals and other machinery in the vicinity of the equipment in the case of an equipment malfunction. Currently, there are two types of enclosures that are generally used. The first type of enclosure is an on-base enclosure, where walls of the enclosure are attached to the base holding the equipment in place. Another type of enclosure is an off-base enclosure, where walls of the enclosure are supported by a separate or independent support structure, other than the base holding the equipment, such as a foundation.

Both on-base and off-base enclosures have advantages and disadvantages. The advantages of the on-base enclosure are that enclosures can be easily constructed by attaching walls to the base of the machine, which results in enclosures that can be rapidly built. Disadvantages of on-base enclosures include there is little room around the perimeter of the equipment to maneuver around the equipment for inspection or to access the equipment, for example for maintenance. To combat this problem, on-base enclosures have been provided with a series of removable or movable panels that are necessary to remove or open for inspection or maintenance. This adds considerable time to open or remove these panels for inspection or maintenance. Also, these panels, due to their removable or movable nature, generally do not provide sufficient acoustical attenuation of sound generated by the equipment.

Off-base enclosures are often built a distance away from the perimeter of the machine to provide for greater room around the perimeter of the machine. However, off-base enclosures typically need a separate foundation to support the walls and roof of the enclosure. This results in increased installation time, the need to build an additional foundation and, in the case of fire extinguishing agent, a larger amount is generally needed for an off-base enclosure. Further, off-base enclosures are often built with more space than necessary around the equipment.

There is a need in the art to provide an enclosure for equipment that has the ease of building of an on-base enclosure, with increased space provided by an off-base enclosure.

SUMMARY OF THE INVENTION

Generally stated, the present invention provides an enclosure for equipment mounted on a base. The enclosure has a plurality of outer walls attached to the base; a chamber formed by the outer walls, wherein the chamber is sized to hold said equipment. The chamber has a horizontal cross-sectional surface area. The base has a horizontal base area and a perimeter edge. At least one of the outer walls is attached to the base such that the at least one outer wall is extended a distance outward from the perimeter edge of the base. This provides a chamber having a cross-sectional surface area, which is greater than the surface area of the base. The enclosure provides more room within the enclosure to access the equipment mounted on the base.

In addition, provided is an equipment piece enclosed within an enclosure having a piece of equipment mounted on a base. The base has an upper surface with a horizontal base area and a perimeter edge. A plurality of outer walls are attached to the base at a distance such that at least one outer wall is extended a distance outward from the perimeter edge of the base. The outer walls form a chamber, which is sized to hold the piece of equipment, and the chamber has a horizontal cross-sectional surface area. The cross-sectional surface area of the chamber is greater than the base area and the plurality of outer walls form the enclosure.

Also provided is a method of assembling an enclosure on a base having a piece of equipment mounted to the base. The method includes providing a base having a piece of equipment attached thereto, where the base has a perimeter edge; providing a plurality modular extension units, each modular extension unit comprising an outer wall, a lower face and an upper face; and attaching the modular extension units to the base, such that the outer wall of each modular extension unit is located a distance away from the perimeter edge of the base.

DETAILED DESCRIPTION OF THE INVENTION

To gain a better understanding of the invention, attention is directed to the Figures of the present specification.

Figure 1:
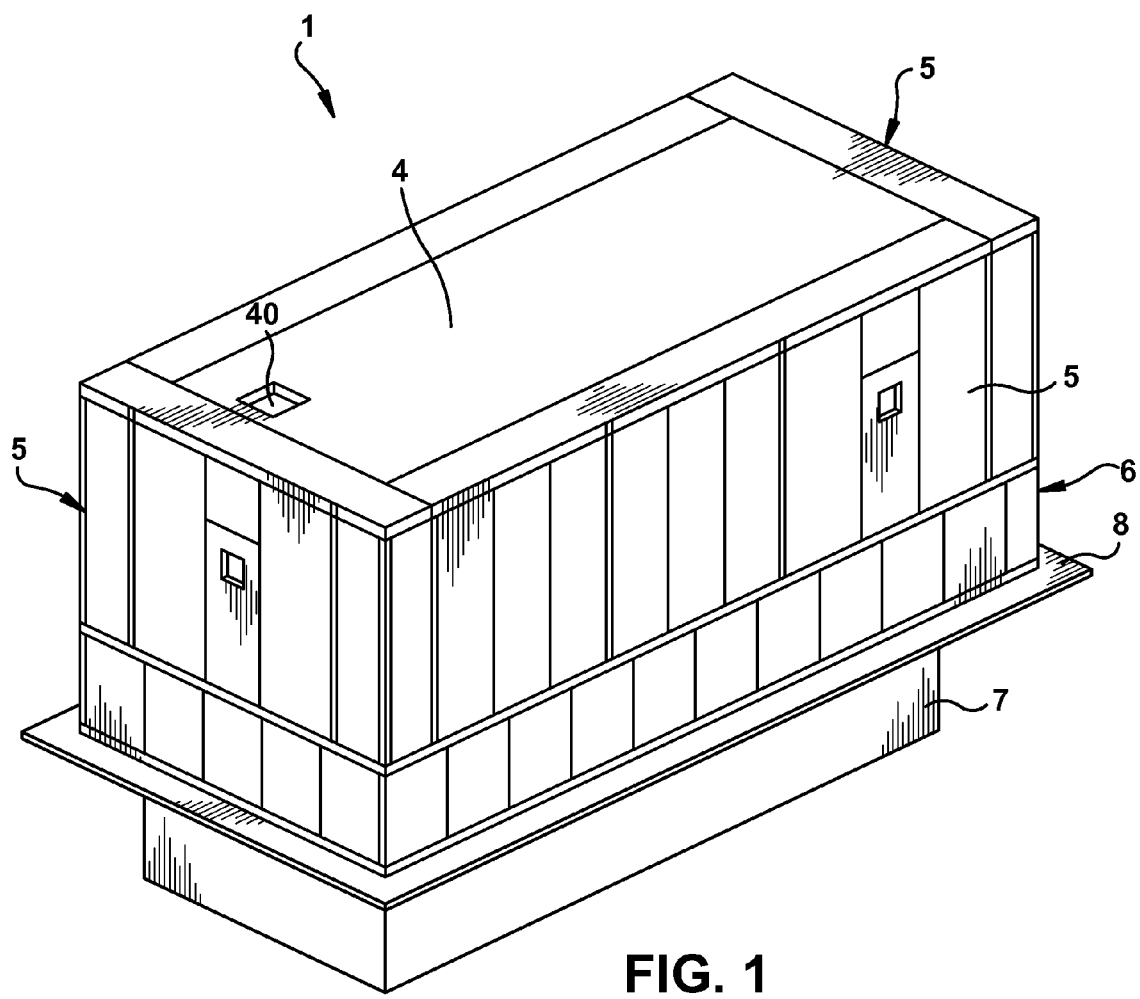
FIG. 1 illustrates an exemplary on-base enclosure.
Figure 2:
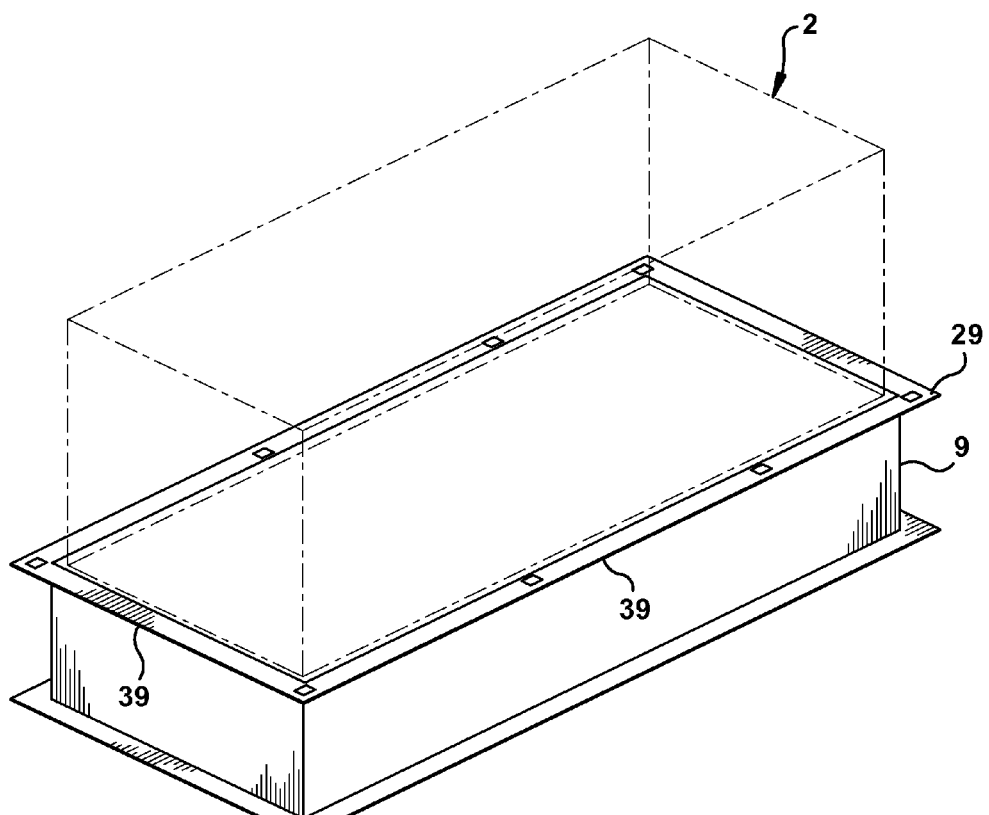
FIG. 2 depicts an equipment on a base, prior to installation of an on-base enclosure.

Referring to FIGS. 1 and 2, shown is enclosure 1 on base 9. Equipment 2 (shown only as a general volume phantom box) is supported by and mounted to base 9. Base 9 has an upper surface 29 with perimeter edge 39 extending around base upper surface 29. Upper surface 29 may extend out from base 9, as shown in FIG. 2, or may be flush with base 9 (not shown). Upper surface 29 is part of the base 9. Attached to base 9 is a plurality of outer walls 5. Outer walls 5 form chamber 3, shown in FIG. 4, which surrounds and encloses equipment 2. Chamber 3 is an interior room formed by enclosure 1. Enclosure 1 may further have upper wall or roof 4, which serves to enclose equipment 2 within chamber 3. Chamber 3 has an interior volume, which is defined by inner surfaces of outer walls 5, upper surface 29 of base 9 and an inner surface of roof 4. This interior volume of chamber 3 is greater that the volume of the equipment 2.

Figure 4:
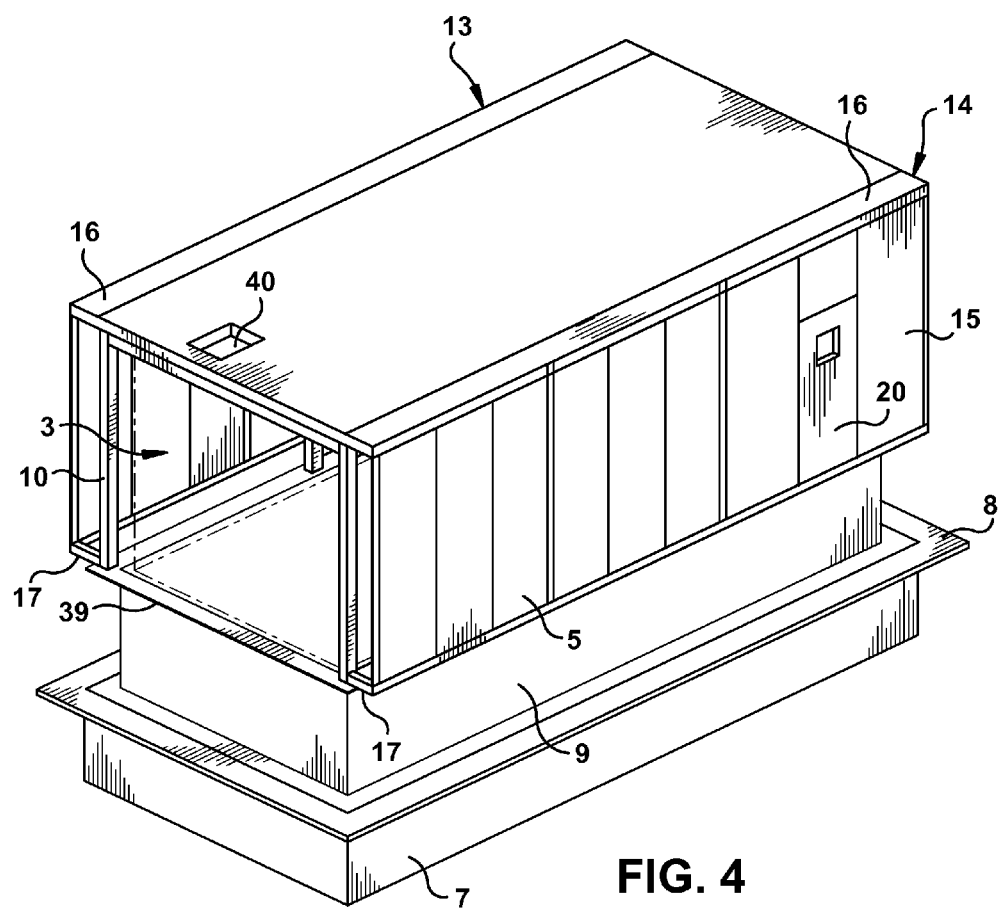
FIG. 4 depicts an on-base enclosure having sidewalls, extensions and a roof.

At least one of outer walls 5 is positioned a distance away from perimeter edge 39 of upper surface 29, as shown in FIG. 4. Positioned between outer wall 5 and positioned away from perimeter edge 39 of base 9 is lower face 17. In addition, upper face 16 may also be present. Lower face 17 serves as an extension of the upper surface 29 of the base 9, thereby enlarging the space around equipment 2 within chamber 3. Upper face 16 serves as an extension of the top wall panel or roof 4. Lower face 17 is connected, directly or indirectly, to both base 9 and outer wall 5 and increases the horizontal cross-sectional area of chamber 3, by a surface area of lower face 17. This additional surface area or floor space within enclosure 1 allows a worker to more easily access equipment 2 from inside chamber 3 of enclosure 1, providing for improved access to equipment 2 for maintenance, repairs and necessary adjustments. It is contemplated that just one outer wall, all of the outer walls or a number of outer walls in between one and the total number of outer walls may be positioned away from perimeter 39 of base 9.

As shown in FIGS. 1 and 4, generally, base 9 is supported by foundation 7 and slab 8. Foundation 7 may be any suitable foundation including, for example, a poured concrete foundation. Base 9, with equipment 2 is positioned on slab 8 and supported by foundation 7. Also supported by foundation 7 is the enclosure 1. Slab 8 may extend outside of foundation 7, as shown in FIGS. 1 and 4, or may optionally flush with foundation 7 (not shown).

Figure 5:
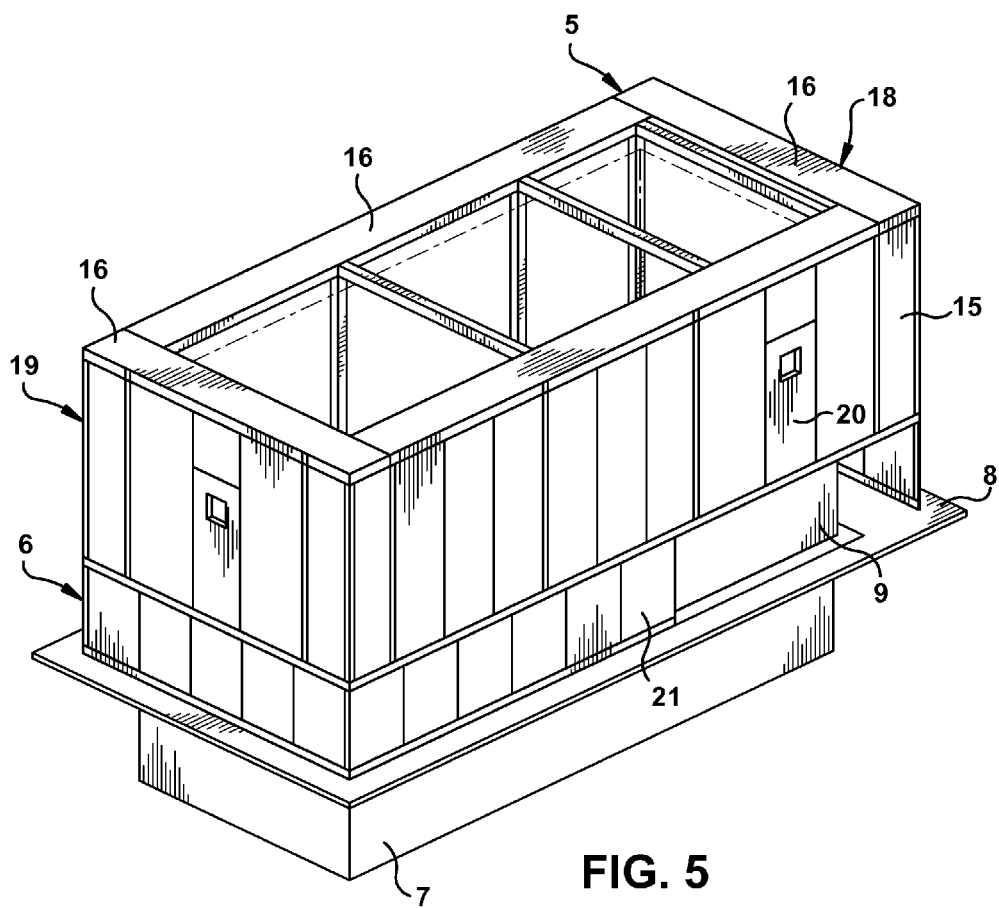
FIG. 5 depicts an on-base enclosure having sidewalls, end walls, and extensions.

Outer walls 5 may be part of modular extension unit 13, 14, as shown in FIG. 4, where outer wall 5, upper face 16 and lower face 17 are joined together. As shown, modular extension units 13, 14 are shown as lateral modular extension units. These extension units 13, 14 may be mounted to structure 10. As shown in FIG. 5, the ends of enclosure 1 are enclosed with extensions units 18, 19. Modular extensions 18, 19 are shown as end modular extension units. Like modular extensions units 13, 14, modular extensions units 18, 19 have an outer wall 5, an upper face 16 and a lower face (not shown in FIG. 5). By providing the extension units as modular units, the walls and extension units of enclosure 1 may be built in factory conditions and shipped on site for assembly to form enclosure 1.

Figure 3:
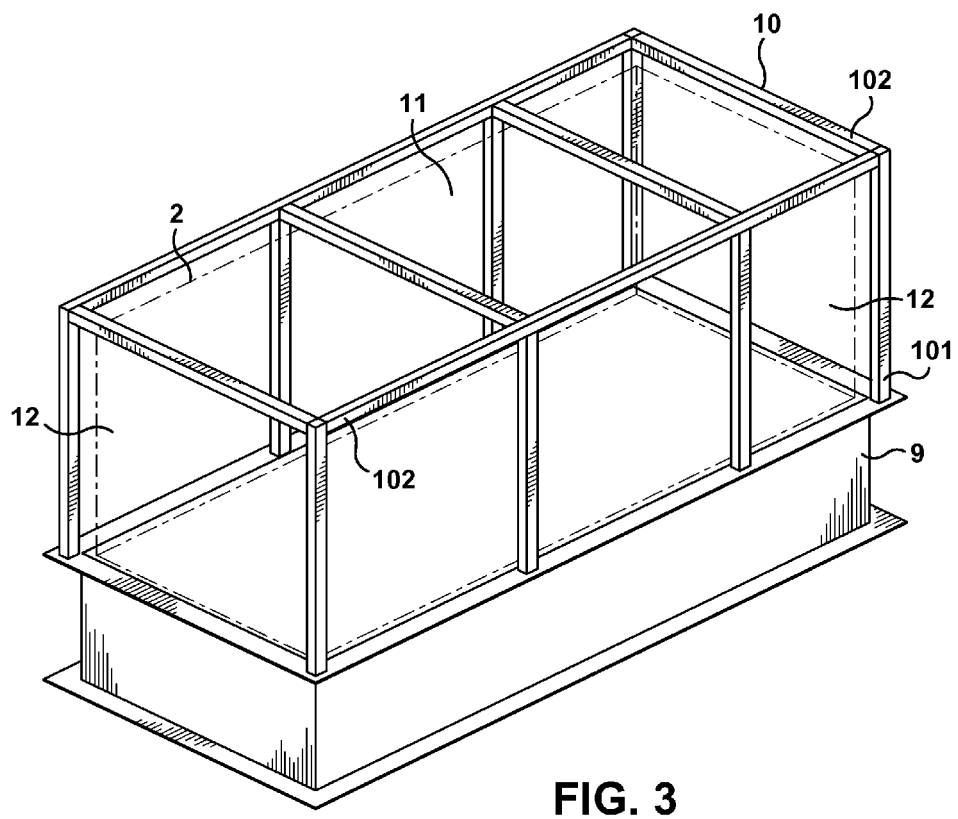
FIG. 3 depicts a structure surrounding an equipment on a base, prior to installation of an on-base enclosure.

Referring to FIG. 3, structure 10 may be mounted to base 9. Structure 10 will generally mounted on base 9 outside the volume of equipment 2. Generally, structure 10 will be mounted on the upper surface 29 of base 9 just inside the perimeter 39 of surface 29. Structure 10, when in the form of framework as shown in FIG. 3, may provide support to outer walls 5 and/or the extension units 13, 14, 18 and 19 by providing an anchoring point for outer walls 5 or extension units 13, 14, 18 and 19. In addition, structure 10 may provide support for top wall or roof 5. As shown in FIG. 2, structure 10 is formed of vertical elements 101 and horizontal elements 102, which come together to form a framework where vertical elements 101 are connected to one another by horizontal elements 102. Alternatively, the vertical elements 101 may be connected to one another by diagonal elements (not shown) or the horizontal elements 102 may be connected to one another by diagonal elements (not shown) or curved elements (not shown) depending on the shape of enclosure 1. The actual configuration of structure 10 is not critical, so long as the structure will support the outer walls 5, or extensions units 13, 14, 18, 19 and roof 4 of enclosure 1. In addition, structure 10 should open lateral faces 12 and open upper face 11 the elements 101, 102, to provide easy access to the equipment 2 which is surrounded by structure 10. Structure 10 may be prepared from any material that will support outer walls 5 or extensions units 13, 14, 18, 19 and roof 5; however, materials that withstand heat, vibration and fire, such as metal, would be advantageous.

Structure 10 may be formed on the base prior to shipment of the base and equipment from the place of manufacture to the installation site. If this is the case, roof 4 may be placed on structure 10 prior to shipment. In addition, structure 10 may be used to support a protective covering for equipment 2 during shipment. The protective covering may be in the form of a tarp or other similar structure that will protect equipment 2 during shipment. The protective covering may be anchored to structure 10.

Upper surface 29 has a defined surface area, which is equal to the horizontal planer surface area of upper surface 29. Chamber 3 has a horizontal cross-sectional area, which is generally measured at or near upper surface 29. The horizontal cross-sectional area of chamber 3 is larger than the horizontal planer surface of upper surface 29, due to the positioning of at least one outer wall 5 away from perimeter edge 39 of the upper surface.

Outer walls 5 may be prepared from a variety of materials, including but not limited to, metal, laminates of different materials and the like. Generally, outer walls 5 may be formed from material that has acoustical insulating properties. Outer wall 5 may be formed from a single panel or, as shown in FIG. 4, outer wall 5 may be formed from a series of panels 15. In addition to panels 15, the outer wall may be optionally provided with at least one access door 20, which will allow personal to enter enclosure 1 from the outside environment.

Base 9 may further be provided with an exterior sheathing 6. This exterior sheathing 6 may be used to cover the entire perimeter of base 9, which can serve as an acoustical or thermal insulation for base 9. Exterior sheathing 6 may be a single panel (not shown) or a series of panels 21, as shown in FIG. 5. Exterior sheathing 6 may be supported by slab 8, when the slab extends beyond foundation 7, as shown in FIG. 4. Exterior sheathing 6 may be applied to the base 9 prior to transportation to the installation site or may be installed at the installation side. Generally, sheathing 6 is installed at the installation site.

Equipment 2 may be various different pieces of machinery including, for example, a gas turbine, an auxiliary module for a gas turbine or other similar pieces of equipment in a plant which may need protection from the outside element or needs to be sounded to protect the surrounding environment and personal in the vicinity of equipment 2. Generally, enclosure 1 serves to provide a thermal barrier, an acoustical barrier or a combination thereof, between the equipment and the environment surrounding the equipment.

Enclosure 1 provides the space of an off-base enclosure, with the convenience and easy of assembly of an on-base enclosure. Enclosure 1 generally provides addition space around the equipment, without the need to provide additional large quantities of an extinguishing agent for the increased space. Further, the additional space is not so large as to potentially provide stagnant zones within the enclosure, which could potentially cause issues within the enclosure.

Enclosure 1 may be fully closed or partially open. As shown in FIGS. 1 and 4, enclosure 1 may have one or more openings 40, which can provide ventilation to enclosure 1, provide access for piping and the like to enter and exit enclosure 1. Openings 40 may be provided in the roof 4, in the outer walls 5, upper face 16 and/or lower face 17. Optionally, enclosure 1 may have panels 15 that may be partially open, or removable to allow further access to the equipment, if necessary.

In assembling the enclosure, generally, base 9 with equipment 2 attached thereto is transported to the location equipment 2 is to be installed. Typical forms of transportation include, rail car, tractor-trailer or other suitable means. Many times the equipment and base may be sized that it is difficult to move equipment 2 to the location of installation due to the width, length, or height of equipment 2. Generally, base 9 with equipment 2 is shipped without extensions 13, 14, 18 and 19 or the roof panel 4. This because the extensions 13, 14, 18 and 19, if attached to the base, would increase the overall length or width of equipment 2/base 9 combination. As is stated above, structure 10 may be shipped already built on base 9 or may be shipped in a separate shipment, for example with extensions 13, 14, 18 and 19. Generally, if structure 10 will increase the width, length or height of equipment 2/base 9 combination, structure 10 will be separately shipped and assembled at the installation site.

Figure 6:
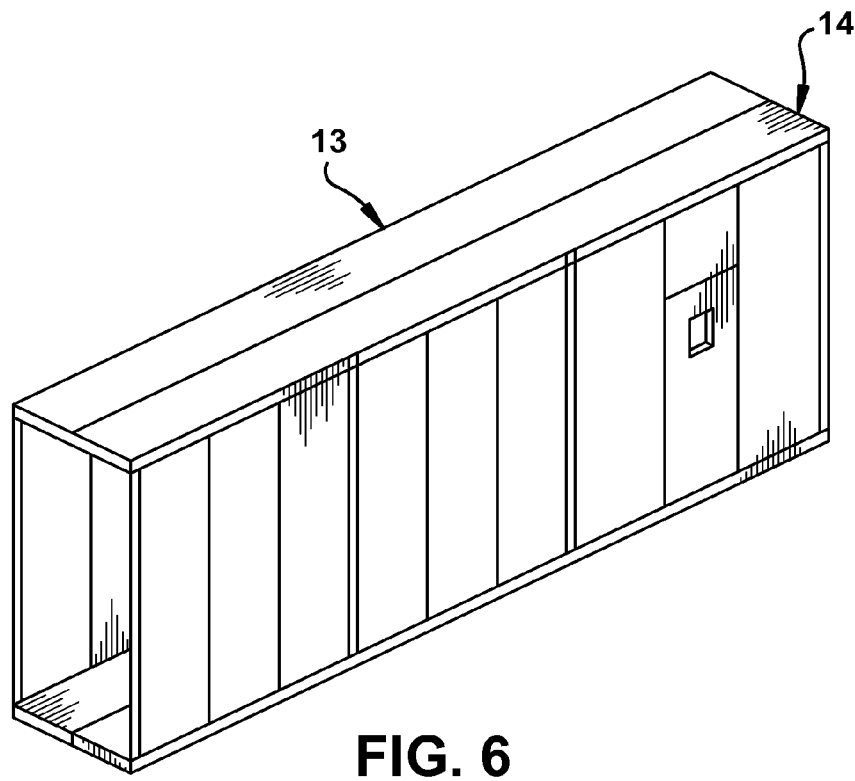
FIG. 6 depicts a sidewall of the on-base enclosure with an extension.
Figure 7:
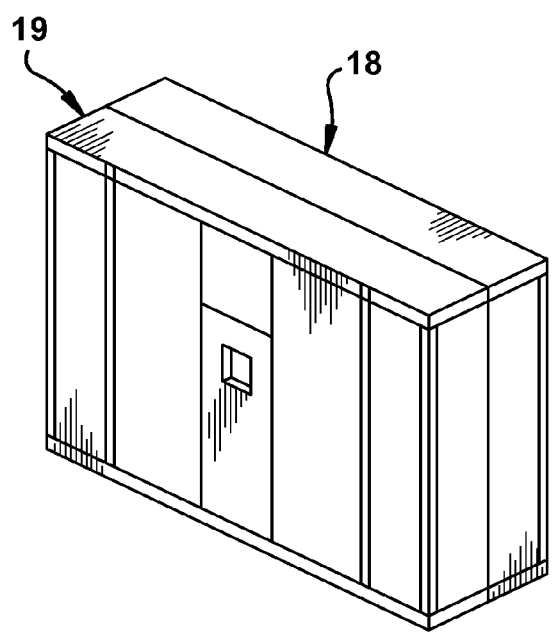
FIG. 7 depicts an end wall of the on-base enclosure with an extension.

To facilitate shipment of extensions 13, 14, 18 and 19, extensions 13 and 14 may be a paired together and extensions 18 and 19 may be paired together, as is shown in FIGS. 6 and 7. By pairing extension together, the extensions will occupy a smaller volume during transport and will provide more stability to each extension during transport. Alternatively, if equipment 2/base 9 combination with extensions 13, 14, 18 and 19 attached is of a width, length or height that can be easily transported as a single unit, then extensions 13, 14, 18 and 19 may be assembled on base 9 prior to shipment.

Once base 9 with equipment 2 arrives at the plant or place of installation, base 9 with equipment 2 is carefully positioned on foundation 7/slab 8, such that base 9 is supported by foundation 7. Generally, foundation 7/slab 8 are built prior to arrive of base 9 and equipment 2. Next structure 10, if necessary, is assembled on base 9. Once the structure 10 is build, then extensions 13, 14, 18 and 19 are attached to base 9, and optionally structure 10, if necessary. Regarding roof 4, it may be attached to frame 10 prior to shipment to the installation site, or may be installed at the installation site of the equipment.

Although the present invention has been described with reference to various embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

The invention claimed is:

1. An enclosure for equipment mounted on a base, said enclosure comprising:
a plurality of modular extension units attached to a perimeter edge of the base, wherein each of the plurality of modular extension units includes:
a lower panel attached to and extending away from the perimeter edge of the base;
a plurality of outer walls each located a distance away from the perimeter edge of the base, and vertically attached to the lower panel;
an upper panel coupled to the plurality of outer walls;
a roof coupled to the upper panel of each of the plurality of modular extension units; and
a chamber sized to hold the equipment and formed by the roof, the base, and the plurality of modular extension units, wherein the chamber includes a single floor defined by a horizontal upper surface of the base and the lower panels of the plurality of modular extension units, and wherein a horizontal cross-sectional area of the chamber is greater than the area of the horizontal upper surface of the base.

2. The enclosure according to claim 1, further comprising a frame structure attached to the base, wherein the plurality of outer walls are attached to the frame structure.

3. The enclosure according to claim 1, wherein the one of the plurality of outer walls further comprises an access door.

4. The enclosure according to claim 1, wherein the plurality of outer walls further comprise insulated panels which provide at least one of acoustical and thermal insulation to the enclosure.

5. The enclosure according to claim 1, further comprising sheathing at least partially surrounding the base.

6. The enclosure according to claim 1, wherein the horizontal cross-sectional surface area of the chamber is sized to allow a worker to access the equipment for one of maintenance, repairs and adjustments while inside the chamber.

7. The enclosure according to claim 1, wherein the plurality of modular extension units includes at least three modular extension units.

8. An equipment piece enclosed within an enclosure comprising:
a piece of equipment mounted on a base, the base having an upper surface with a horizontal base area and a perimeter edge;
a plurality of modular extension units attached to a perimeter edge of the base, wherein each of the plurality of modular extension units includes:
a lower panel attached to and extending away from the perimeter edge of the base;
a plurality of outer walls vertically attached to the lower panel at a distance such that at least one of the plurality of outer walls is extended a distance outward from the perimeter edge of the base;
an upper panel coupled to the plurality of outer walls;
a roof coupled to the upper panel of each of the plurality of modular extension units; and
a chamber sized to hold the equipment and formed by the roof, the base, and the plurality of modular extension units, wherein the chamber includes a single floor defined by a horizontal upper surface of the base and the lower panels of the plurality of modular extension units, and wherein a horizontal cross-sectional area of the chamber is greater than the area of the horizontal upper surface of the base area.

9. The equipment piece enclosed within an enclosure according to claim 8, further comprising a frame structure attached to the base, wherein the plurality of outer walls are attached to the frame structure.

10. The enclosure equipment piece enclosed within an enclosure according to claim 8, wherein one of the plurality of outer walls further comprises an access door.

11. The equipment piece enclosed within an enclosure according to claim 8, wherein the plurality of outer walls further comprise insulated panels which provide at least one of acoustical and thermal insulation to the enclosure.

12. The equipment piece enclosed within an enclosure according to claim 8, further comprising sheathing at least partially surrounding the base.

13. The equipment piece enclosed within an enclosure according to claim 8, wherein the horizontal cross-sectional surface area of the chamber is sized to allow a worker to access the equipment for one of maintenance, repairs and adjustments while inside the chamber.

14. The equipment piece enclosed within an enclosure according to claim 8, wherein the plurality of modular extension units includes at least three modular extension units.

* * * * *